United States Patent [19]

Moracz et al.

[11] Patent Number: 4,583,274

[45] Date of Patent: Apr. 22, 1986

[54] METHOD OF MAKING AN AIRFOIL

[75] Inventors: Donald J. Moracz, Garfield Heights; Charles R. Cook, Euclid; Istvan J. Toth, Richmond Heights, all of Ohio

[73] Assignee: TRW Inc., Cleveland, Ohio

[21] Appl. No.: 652,759

[22] Filed: Sep. 20, 1984

Related U.S. Application Data

[62] Division of Ser. No. 353,403, Mar. 1, 1982, Pat. No. 4,472,866.

[51] Int. Cl.$^4$ .................. B21K 3/04; B23P 15/02; B23P 15/04
[52] U.S. Cl. ................ 29/156.8 B; 29/423; 29/463; 29/469; 29/DIG. 16; 228/182; 228/190; 228/193; 416/229 R; 416/232
[58] Field of Search ............. 29/DIG. 16, 156.8 B, 29/156.8 H, 156.8 T, 423, 463, 469, 557; 228/182, 190, 191, 193, 243; 416/229 R, 232, 233

[56] References Cited

U.S. PATENT DOCUMENTS

| | | | |
|---|---|---|---|
| 2,963,269 | 12/1960 | Gerdan et al. | 29/156.8 H |
| 3,012,308 | 12/1961 | Zech et al. | 29/156.8 B |
| 3,052,961 | 9/1962 | Sherman | 416/232 X |
| 3,314,374 | 4/1967 | Schellens | 29/156.8 B |
| 3,368,795 | 2/1968 | Bolin et al. | 29/156.8 B X |
| 3,588,980 | 6/1967 | Cogan | 416/233 |
| 3,600,103 | 8/1971 | Gray et al. | 228/190 X |
| 3,619,082 | 7/1968 | Meginnis | 29/156.8 B X |
| 3,627,443 | 12/1971 | Pirzer | 416/233 |
| 3,628,226 | 12/1971 | Nelson | 29/156.8 H |
| 3,653,110 | 4/1972 | King, Jr. et al. | 29/156.8 B X |
| 3,781,130 | 12/1973 | Tall | 29/156.8 H X |
| 3,800,398 | 4/1974 | Harrington, Jr. | 29/423 |
| 3,872,563 | 3/1975 | Brown et al. | 29/156.8 B |
| 3,942,231 | 3/1976 | Whitaker | 29/156.8 B |
| 4,364,160 | 12/1982 | Eiswerth et al. | 228/193 X |

Primary Examiner—Howard N. Goldberg
Assistant Examiner—Ronald S. Wallace
Attorney, Agent, or Firm—Yount & Tarolli

[57] ABSTRACT

An improved method of making an airfoil includes stacking plies in two groups. A separator ply is positioned between the two groups of plies. The groups of plies and the separator ply are interconnected to form an airfoil blank. The airfoil blank is shaped, by forging or other methods, to have a desired configuration. The material of the separator ply is then dissolved or otherwise removed from between the two sections of the airfoil blank to provide access to the interior of the airfoil blank. Material is removed from inner sides of the two separated sections to form core receiving cavities. After cores have been placed in the cavities, the two sections of the airfoil blank are interconnected and the shaping of the airfoil is completed. The cores are subsequently removed from the completed airfoil.

5 Claims, 9 Drawing Figures

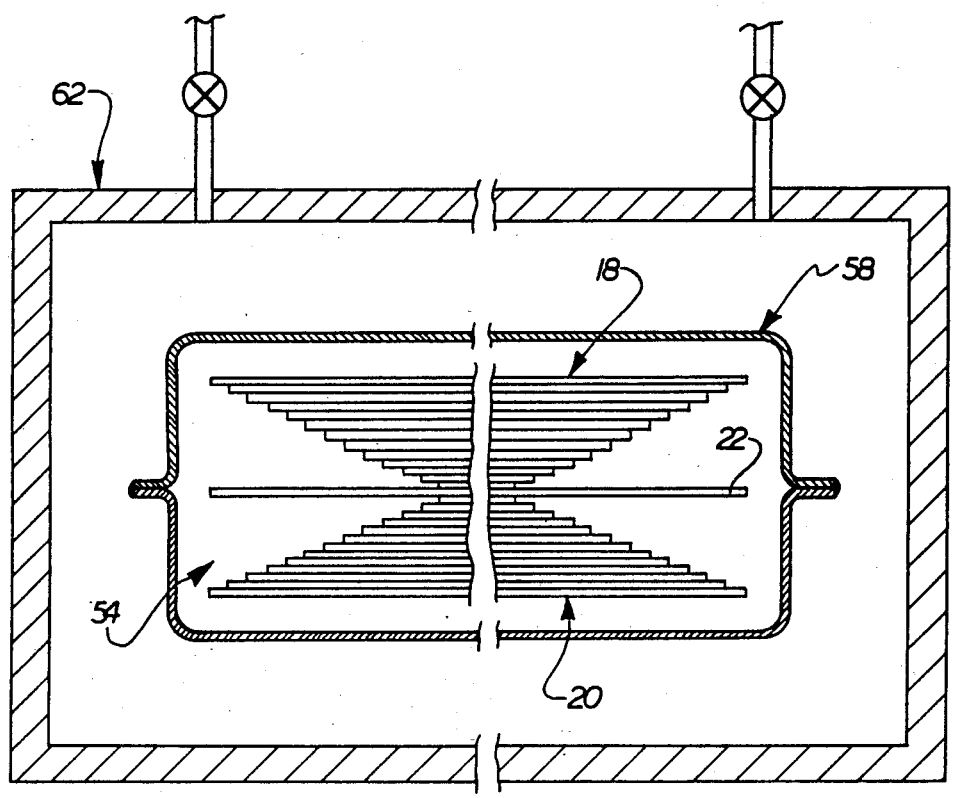
FIG.4
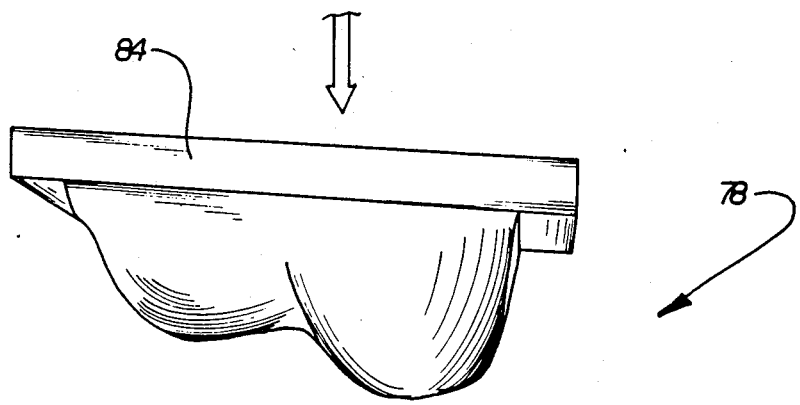
FIG.6
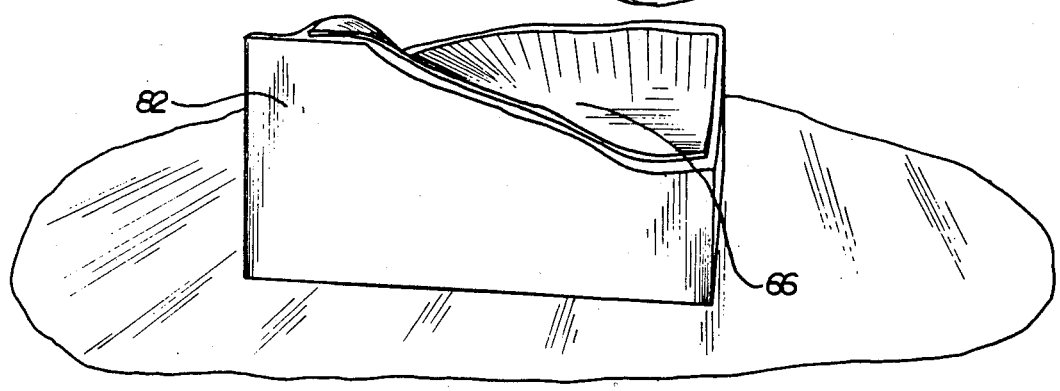

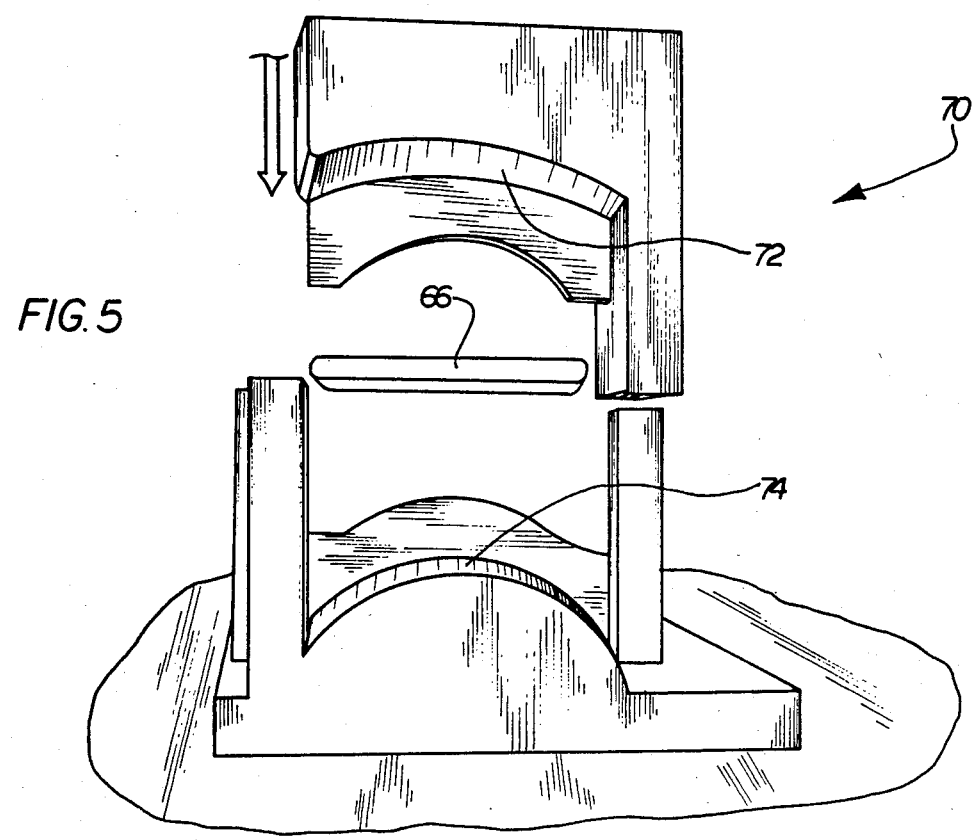
FIG. 5
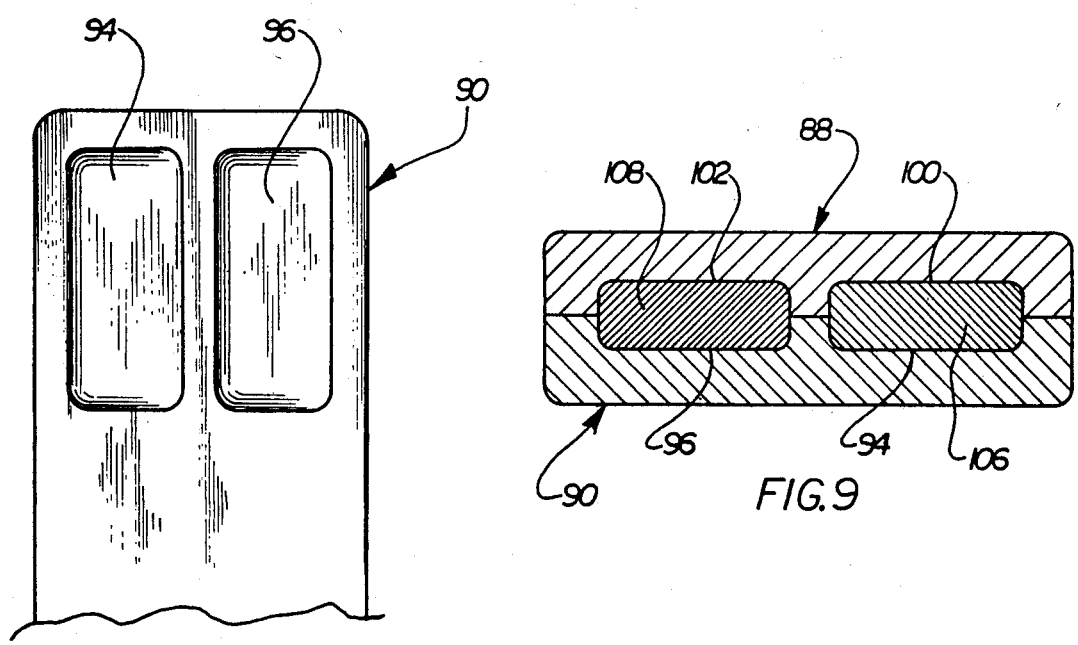
FIG. 8
FIG. 9

METHOD OF MAKING AN AIRFOIL

BACKGROUND OF THE INVENTION

The invention described herein was made in performance of work under NASA Contract No. NAS 3-20646 and is subject to the provisions of Section 305 of the National Aeronautics and Space Act of 1958 (72 Stat. 435; 42 USC 2457).

This is a division of application Ser. No. 353,403, filed Mar. 1, 1982, now U.S. Pat. No. 4,472,866, issued Sept. 25, 1984.

Turbine blades and similar airfoils have previously been formed by stacking plies which are diffusion bonded together at high temperatures and pressures, for example, see U.S. Pat. No. 3,942,231. It has been suggested that a cavity could be provided in this type of airfoil by cutting openings of a suitable configuration in the plies or sheets. The cavity formed by the cut-out areas of the plies is filled with a core of steel or ceramic material. The core is provided to maintain the shape of the cavity during the diffusion bonding and/or subsequent shaping of the airfoil. Once the airfoil has been shaped, the core is removed by dissolving it with a solution which does not affect the material forming the plies.

One of the problems which has been encountered with this method of making an airfoil is maintaining the desired location of the cavity during bonding and/or subsequent shaping of the airfoil. Due to the relatively high pressures to which the airfoil is subjected during bonding and/or forming, the core tends to shift somewhat relative to the plies with a lack of fill and/or bond at the region of the interface between the core and the plies.

BRIEF SUMMARY OF THE INVENTION

The present invention minimizes problems in maintaining the location of a cavity in an airfoil formed by bonding a stack of plies. This is accomplished by forming the plies without cut-out areas to define a cavity. The plies are stacked in two groups with a separator ply between the groups of plies. The two groups of plies are connected with the separator ply, by diffusion bonding or other methods, to form an airfoil blank by having solid sections disposed on opposite sides of the separator ply. The airfoil blank is shaped, by hot forging or other methods, to have a desired configuration.

Thereafter, the material of the metal separator ply between the two sections of the airfoil blank is dissolved to separate the sections of the airfoil blank and provide access to the interior of the blank. Material is removed from one or both of the sections of the airfoil blank to form a cavity. A core is positioned in the cavity and the sections of the airfoil blank are interconnected by diffusion bonding or other methods. The airfoil, with the core in place, may then be given a final shaping to a desired configuration. The core is subsequently removed by leaching out the core material with a suitable solution which is conducted to the cavity through holes formed in an end of the airfoil.

Although it is preferred to practice the present invention by forming sections of an airfoil blank from a plurality of plies, it is contemplated that the invention could be practiced by forming each section of the airfoil blank of a single piece of material. These sections would be placed on opposite sides of and connected to a separator ply. After shaping of the airfoil blank, the material of the separator ply would subsequently be removed to provide access to the interior of the blank.

Accordingly, it is an object of this invention to provide a new and improved method of making an airfoil by interconnecting groups of plies on opposite sides of a separator ply to form an airfoil blank and then providing access to the interior of the airfoil blank by dissolving the material of the separator ply.

Another object of this invention is to provide a new and improved method of making an airfoil by shaping a separator piece and airfoil sections while they are interconnected and then removing the material of the separator piece from between the airfoil sections.

BRIEF DESCRIPTION OF THE DRAWINGS

The foregoing and other objects and features of the present invention will become more apparent upon a consideration of the following description taken in connection with the accompanying drawings wherein:

FIG. 4 is a schematic illustration depicting the manner in which the two stacks of plies and the separator ply of FIG. 2 are encapsulated and placed in an autoclave for a hot isostatic pressing operation which diffusion bonds the plies together to form an airfoil blank;

FIG. 5 (on sheet 4 of the drawings) is a schematic illustration of tooling used to shape the airfoil blank to have a camber corresponding to the desired camber of the airfoil;

FIG. 6 (on sheet 3 of the drawings) is a schematic illustration of tooling used to shape the airfoil blank to have a twist corresponding to a desired twist of the airfoil;

FIG. 8 (on sheet 4 of the drawings) is a schematic illustration depicting the relationship between cavities formed in one section of an airfoil blank after the material of the separator ply has been removed from between the sections of the airfoil blank; and FIG. 9 is a schematic sectional view illustrating the relationship between sections of the airfoil blank and cores placed in the cavities of FIG. 8 during final shaping and diffusion bonding of the sections of the airfoil.

DESCRIPTION OF ONE SPECIFIC PREFERRED EMBODIMENT OF THE INVENTION

A turbine blade 10 (FIG. 1) constructed by the method of the present invention includes an airfoil 12 and a root or base 14. The airfoil 12 has internal cavities 15 and 16 disposed between opposite major side surfaces of the airfoil. The root or base 14 may be formed of a pair of separate root blocks and connected with the airfoil 12 in a manner similar to that disclosed in U.S. Pat. No. 3,942,231 or may integrally formed with the airfoil 12. It should be understood that the specific configuration of the base 14 of the turbine blade 10 and the specific configuration of the airfoil 12 and cavities 15 and 16 may vary. In addition, it is contemplated that the airfoil 12 may be formed separately from the base 14 and subsequently connected with a suitable base.

Figure 1:
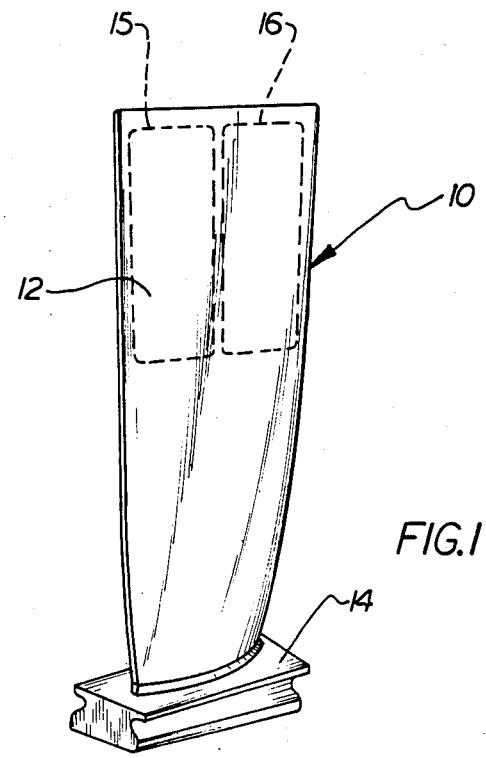
FIG. 1 is an illustration of an airfoil constructed with the method of the present invention.
Figure 2:
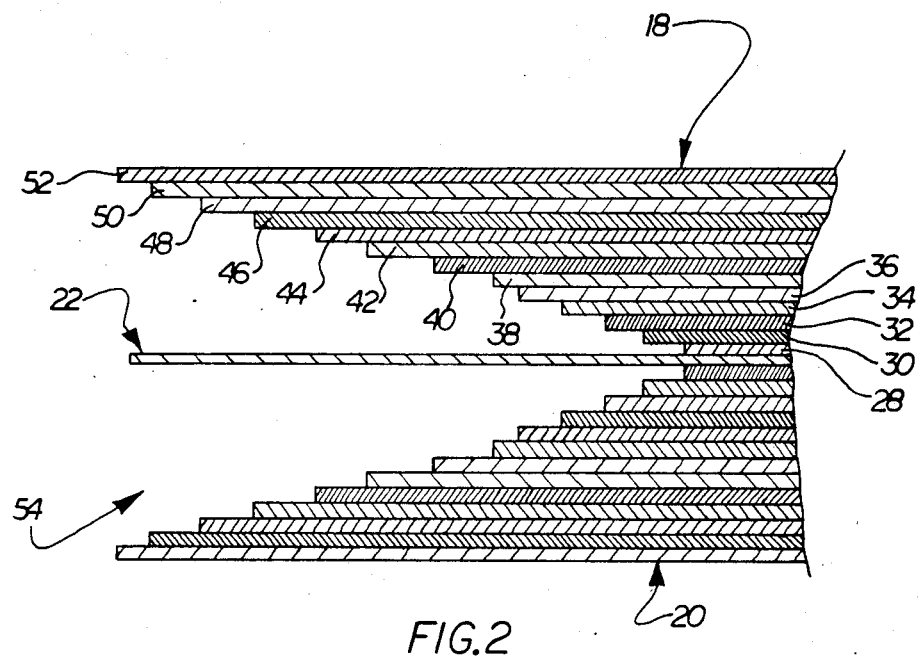
FIG. 2 is a schematic sectional view illustrating the manner in which stacks of plies are placed on opposite sides of a separator ply.

In order to form the airfoil 12, two solid stacks or groups 18 and 20 of longitudinally extending plies or sheets of material are positioned on opposite sides of a separator ply or sheet 22 in the manner illustrated schematically in FIG. 2. The stack of plies 18 on the upper side of the separator sheet 22 provides the material for forming one longitudinally extending section of the airfoil 12. The stack 20 of plies on the lower side of the separtor sheet 22 provides the material for forming a second longitudinally extending section of the airfoil. The separator ply 22 and each ply in the stacks 18 and 20 of plies has flat continuous side surfaces and is free of openings. Therefore, there are no cavities in the stacks 18 and 20 corresponding to the airfoil cavities 16 and 15 (FIG. 1).

Figure 3:
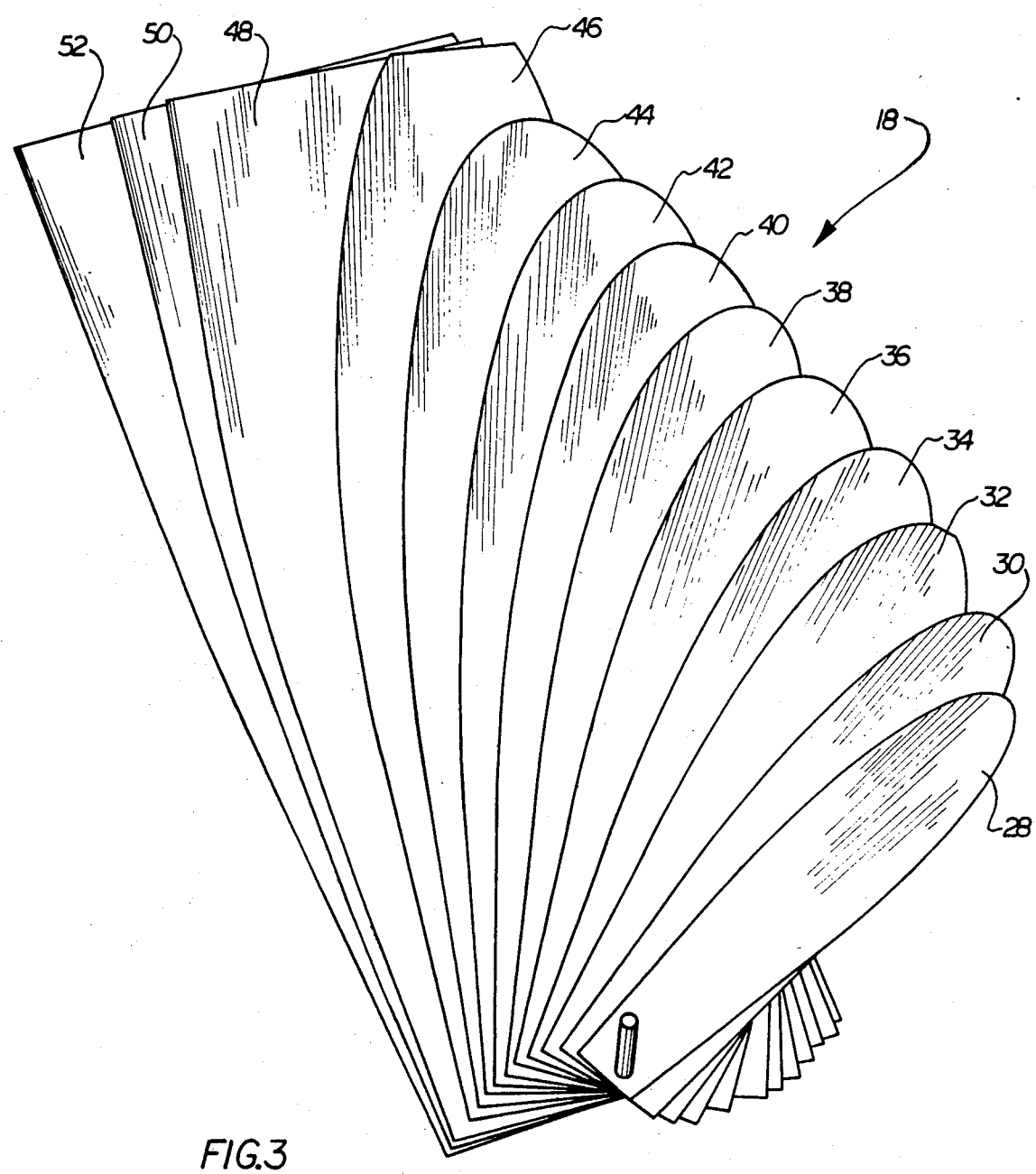
FIG. 3 is a plan view illustrating the configuration of plies forming one of the stacks of plies.

The stack 18 of plies is illustrated in a partially exploded condition in FIG. 3 and includes plies 28, 30, 32, 34, 36, 38, 40, 42, 44, 46, 48, 50 and 52. As can be seen in FIG. 3, the major side surfaces of each of the plies 28-52 are free of openings for defining a cavity in the stack 18 of plies. Although only the plies 28-52 of the stack 18 have been shown in FIG. 3, the plies of the stack 20 have the same general configuration as the plies of the stack 18. Of course, the specific configuration of the plies in the stack 20 will probably be different than the specific configuration of the plies in the stack 18.

The plies can be formed to a desired shape and configuration by first analyzing turbine blade section charts by means of computer computation and descriptive geometry to thereby divide the airfoil 12 into a desired number of laminations. Some of the assumptions which may be used in ply generation are as follows: the plies are to be a predetermined thickness, for example 0.030-inch thick; there are to be full plies on the concave and convex surfaces of the airfoil; there is to be a full ply located along the mean camber line; and a chemical milling envelope, for example 0.0025-inch, should be added. In the embodiment illustrated there were a total of twenty-six plies in the airfoil. However, a different total number of plies, for example, thirty-one plies, could be used if desired. The number of plies is dictated by blade design and ply thickness. In addition, one or more of the ply generation assumptions may be changed from the assumptions set forth above.

Although the plies 28-52 could be produced by a computer controlled punch press, stamping, or numerically controlled milling, it may be preferred to use stamping due to cost when considering production quantities. Although the plies 28-52 could be made of many different materials, the plies are preferably made of titanium, specifically of 0.030-inch thick Ti-6 Al-4V plies having the primary working direction of the sheet perpendicular to the stacking axis of the blade. Although it is preferred to form the plies of titanium, it is contemplated that the plies could be formed of nickel or cobalt alloys or similar materials if desired.

After the plies have been cleaned, they are registered relative to each other, pinned, and tack welded in place. This results in a ply assembly 54 in which the plies are arranged in the stacks 18 and 20 on opposite sides of the separator sheet 22. The ply assembly 54 is free of cavities corresponding to the cavities 15 and 16 in the finished airfoil 12.

The ply assembly 54 is then enclosed in a can or container 58 (see FIG. 4). The can or container 58 is formed of two sheets of 0.030-inch thick titanium. However, the container 58 could be made of nickel alloy carbon steel or a material developed for superplastic forming applications, for example, IN-744, if desired. In addition, the container 58 and plies could have a thickness other than the specific thickness set forth herein.

The container 58 is seam welded and placed in an autoclave or hot isostatic pressing apparatus 62. A fluid pressure of approximately 15 thousand pounds per square inch is provided in the autoclave for a time period of approximately 4½ hours at a temperature of 1750° F. Of course, the hot isostatic pressing process could be conducted at temperatures and pressures and for time periods different from the specific ones set forth above.

The temperatures and pressures in the autoclave are sufficient to diffusion bond the plies in each stack 18 and 20 together and to bond the plies to the separator ply 22. This results in the formation of a solid airfoil blank 66 (FIG. 5). In order to prevent bonding of the material of the container 58 (FIG. 4) to the stacks of plies 18 and 20 and separator ply 22, the inside of the container 58 can be separated from the plies by carburized foil, graphite, and/or graphoil to prevent a reaction between the can material and the titanium laminate during the hot isostatic pressing.

After the hot isostatic pressing operation, the resulting flat airfoil blank 66 (see FIG. 5) is transferred to a hydraulic press 70 having upper and lower dies 72 and 74. Before the airfoil blank 66 is transferred to the press 70, excess canning or container material 58 is removed from the blank. In addition, the airfoil blank 66 is covered with a protective glass coating and heated to approximately 1750° F. for 35 to 45 minutes. The dies 72 and 74 in the press 70 are shaped to curve the airfoil blank 66 to provide a camber corresponding to the desired camber in a finished airfoil. Thus, the dies 72 and 74 curve the blank 66 to have an arc of curvature which extends transversely to the longitudinal axis of the airfoil blank.

After cambering in the press 70 and prior to twisting, the airfoil blank 66 is chemically milled. Although the amount of material removed from the airfoil blank during chemical milling may vary, approximately 0.010-inch per side may be removed during the chemical milling. The cambered airfoil blank 66 is then transferred to a press (not shown in the drawings) for twisting. The twisting of the airfoil may be conducted so that the tip section is twisted first and the near root section of the airfoil is twisted last. To this end, the center dies in the press may be preset for a counterclockwise 7.5° twist.

For twisting operations, the tip and root ends of the airfoil blank are coated with a protective coating and heated to about 1750° F. for about 30 minutes. After the center section dies are clamped against the airfoil blank, the tip section dies are rotated counterclockwise until a 10.5° position of the center dies was reached. Both dies are then released and the twisted end cambered airfoil blank 66 is removed from the press.

It should be noted that the foregoing specific extents of arcuate twist and specific mode of twisting the airfoil blank 66 may be varied and it is intended that the specific recitation set forth herein and the manner in which the blade is to be cambered and twisted be for purposes of clarity of illustration and not for purposes of limitation of the invention. In addition, it is contemplated that the extent of camber and/or twist imparted to the blade may vary considerably and, depending upon the desired configuration of the airfoil, may even be omitted. In fact, the airfoil blank 66 could be shaped by a process other than forging if desired. However, since the blank 66 is solid, that is it is free of internal cavities, the blank can be hot forged without fear of distorting internal cavities.

After the airfoil blank 66 has been twisted, it is dimensionally inspected and excess material removed. This may be done by known acid stock removal methods. In one specific instance, dimensional inspection indicated that approximately 0.07-inch of material (0.035-inch per side) should be removed. This was done by acid stock removal techniques within a tolerance range of 0.01-inch. However, it should be understood that the amount of stock which is removed after twisting may be different than the foregoing specific example and that the excess stock, if any, may be removed by techniques other than acid stock removal.

After the airfoil blank has been cambered, twisted and excess material removed, the blank is subjected to isothermal forging in a press 78 (see FIG. 6). Prior to isothermal forging, the airfoil blank 66 is sprayed with a suitable lubricant which acts as a protective coating. The airfoil blank is then preheated in a furnace to approximately 1100° F. for a period of approximately 10 minutes.

The preheated airfoil blank 66 is loaded in to the press 78 between lower and upper dies 82 and 84 which are maintained at a nominal temperature of 1700° F. After a holding period of approximately 10 minutes, the pressure applied by the dies 82 and 84 against the solid airfoil blank 66 is increased to approximately 1,800 tons in a period of approximately five minutes. This pressure is maintained for a period of approximately 10 minutes. The airfoil blank is then removed from the press. If desired, the isothermal forging steps can be repeated. Of course, other isothermal forging temperatures, pressures and time periods could be used if desired. It should be noted that the blank 66 can be subjected to the isothermal forging without deforming internal cavities in the blank 66 because there are no cavities.

After forging, the airfoil blank is inspected. This inspection can include X-ray, pitch thickness, leading and trailing edge thickness, and wall thickness of the blade. It should be understood that the specific airfoil blank shaping operations set forth herein may be varied in any manner desired to obtain an airfoil blank 66 of the desired configuration.

In accordance with a feature of the present invention, access is provided to the interior of the airfoil blank 66 after the foregoing shaping operations have been conducted. Access to the interior of the blank 66 at this time enables the cavities 15 and 16 on the inside of the airfoil 12 to be formed after the blank has been shaped to a configuration closely resembling the airfoil. Access is obtained to the interior of the solid airfoil blank 66 by separating the section of the airfoil blank formed by the material in the stack 18 of plies from the section of the airfoil blank formed by the material in the stack 20 of airfoil plies. This is accomplished by removing the material of the separator ply 22.

Figure 7:
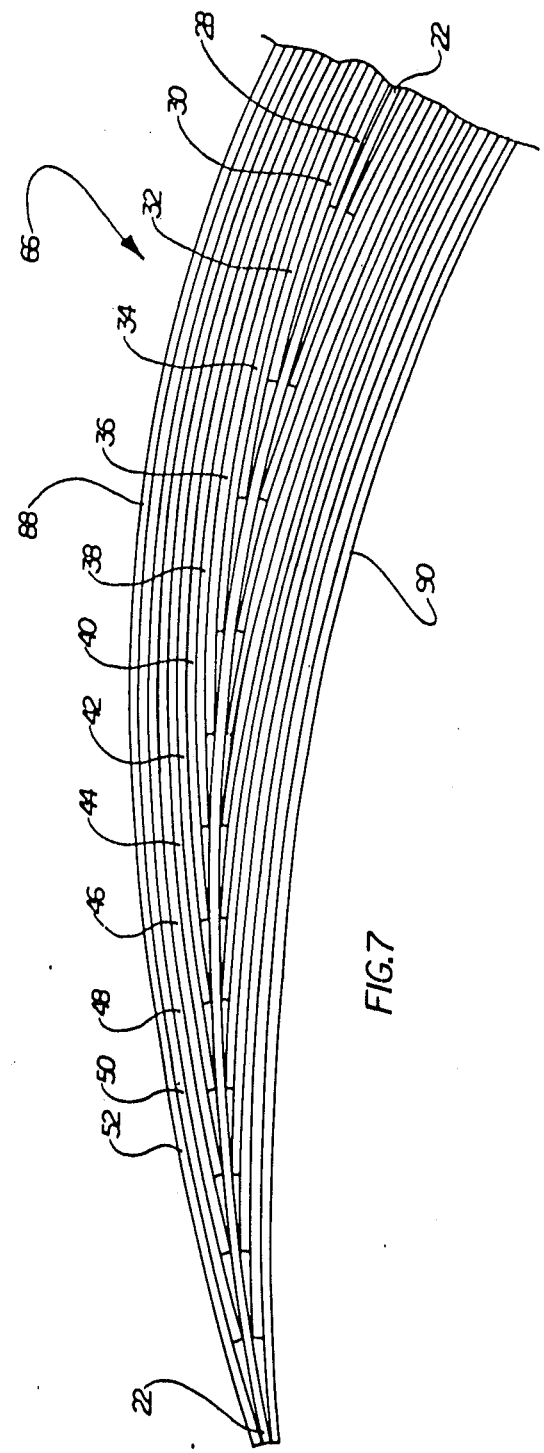
FIG. 7 is a schematic sectional view of an airfoil after it has been diffusion bonded and shaped by the apparatus illustrated in FIGS. 4, 5 and 6, the separate plies being shown for purposes of illustration even though the plies have actually been fused together into a solid mass.

After the airfoil blank has been pressed and forged to the desired configuration, the airfoil blank will have a cross sectional configuration generally similar to that shown in FIG. 7. It should be understood that at this time the plies have been diffusion bonded together into a unitary structure and are not separate from each other in the manner shown schematically in FIG. 7. However, the plies have been shown as being separate for purposes of clarity of illustration.

The material of the separator ply 22 extends between an outer section 88 and an inner section 90 of the airfoil blank 66. The outer section 88 of the airfoil blank 66 is formed by the material in the upper stack of plies 18 in FIG. 4. The inner section 90 of the airfoil blank 66 is formed by the material in the lower stack of plies 20 of FIG. 4. It should be noted that the plies in each of the stacks 18 and 20 are continuous and are free of openings, with the exception of small locating holes used to position plies relative to each other.

In order to separate the outer section 88 from the inner section 90 of the airfoil blank 66, the material separator or middle ply 22 is removed. This is accomplished by exposing the material of the separator ply 22 to a solution which chemically attacks the material of the separator ply. The inner and outer sections 88 and 90 of the airfoil blank 66 are impervious to the solution which is used to chemically attack a separator ply 22.

For example, the separator ply 22 can be made of steel, such as AISI 1045 steel or TRW VMS 478 valve steel having a thickness of 0.030 inches. The separator ply 22 can then be removed from the titanium airfoil blank sections 88 and 90 by leaching the separator ply 22 in a hot (180° F.) water-nitric acid (2:1 ratio) bath. The nitric acid is effective to dissolve the separator ply 22 without attacking the titanium airfoil blank sections 88 and 90. Of course, the separator ply could be of any desired thickness. In addition, the separator ply could be formed of a different material and a different substance used to dissolve the separator ply if desired.

Once the separator ply 22 has been dissolved, the two airfoil blank sections 88 and 90 can be separated to expose their inner side surfaces. When this has been done, cavities are formed in the inner sides of the airfoil sections 88 and 90. Thus, a pair of cavities 94 and 96 (see FIG. 8) can be formed by electrical discharge machining methods or other machining processes on the inside of the airfoil section 90. Similarly, cavities 100 and 102 (see FIG. 9) can be formed on the inside of the airfoil section 88.

Once the cavities 94, 96, 100 and 102 have been formed in the airfoil sections 88 and 90, the airfoil sections are placed back into abutting engagement with each other and interconnected to form a complete airfoil. The airfoil section cavities 94, 96, 100 and 102 cooperate to define two cavities corresponding to the cavities 15 and 16 in the finished airfoil 12. It is contemplated that the airfoil blank sections 88 and 90 may be diffusion bonded together by hot isostatic pressing. The airfoil blank may then be isothermally forged to a final desired configuration.

Although the construction of the airfoil blank sections 88 and 90 may be such as to maintain shape of the cavities 94, 96, 100 and 102 during the interconnecting of the sections 88 and 90 and final shaping of the airfoil, the forces which are present even during minor shaping are such that there will be a tendency for the configuration of the airfoil to be altered around the cavities 94, 96, 100 and 102 during interconnecting and final shaping of the airfoil. Accordingly, metal or ceramic cores 106 and 108 (see FIG. 9) are provided in the cavities 94, 96, 100 and 102 to maintain the configuration of the airfoil during the interconnecting of the sections 88 and 90 and the final shaping of the sections. The cores 106 and 108 have the same configuration as the cavities 15 and 16 in the finished airfoil 12.

While the two sections 88 and 90 are separated, the cores 94 and 96 are placed in the cavities in one of the sections, for example, the cavities 94 and 96 in the airfoil section 90. The other airfoil section, that is the airfoil section 88, is then positioned in abutting engagement with the cores 106 and 108 and the first airfoil section in the manner shown in FIG. 9. The cores 106 and 108 completely fill the cavities between the two airfoil sections and maintain the configuration of the cavities during the interconnecting of the airfoil sections 88 and 90 and final finishing of the airfoil.

The forces which are present during the interconnection and final shaping of the airfoil sections 88 and 90 are substantially less than the forces required to initially interconnect the two stacks 18 and 20 of plies and to forge the plies to form an airfoil blank having a desired camber and twist. Since the airfoil blank sections 88 and 90 are subjected to substantially lower forces and metal movement during their final shaping, there is very little tendency for the cores 106 and 108 to shift relative to the airfoil sections with a resulting deformation of the cavities 94, 96, 100 and 102 inside the airfoil sections.

Once the airfoil sections 88 and 90 have diffusion bonded together and the airfoil has been shaped to the final desired configuration, the cores 106 and 108 are removed. This is accomplished by leaching out the core material in much the same manner as was previously done with the separator ply 22. Thus, the cores 106 and 108 may be formed of AISI 1045 steel or TRW VMS-478 valve steel. The cores are exposed to a hot nitric acid bath by forming generally oval holes in the tip of the airfoil and conducting a nitric acid solution through the holes. Of course, the nitric acid solution chemically attacks the steel cores 106 and 108 without affecting the titanium airfoil and closing the cores. If desired, the cores could be made of another material and removed with a different leaching agent.

In view of the foregoing, it is apparent that the present invention minimizes the problems of maintaining the location of cavities 15 and 16 in the airfoil 12 which may be formed by bonding stacks 18 and 20 of plies. This is accomplished by forming the plies without cut-out areas to define the cavities 94, 96, 100 and 102. The plies are separated into two groups 18 and 20 with a separator ply 22 between the two groups. The two groups 18 and 20 of plies are then interconnected with the separator ply 22, by diffusion bonding or other methods, to form an airfoil blank 66 having solid sections 88 and 90 disposed on opposite sides of the separator ply 22.

The airfoil blank 66 is then shaped, by hot forging or other methods, to have the desired configuration. The metal separator ply 22 between the two sections 88 and 90 of the airfoil blank is then dissolved to separate the sections of the airfoil blank and provide access to the interior of the blank. Material is removed from the sections 88 and 90 of the airfoil blank 66 to form cavities 94, 96, 100 and 102 which cooperate to form the internal cavities 15 and 16 in the finished airfoil 12.

The cores 106 and 108 are then positioned in the cavities and the sections of the airfoil blank are interconnected by diffusion bonding or other methods. The airfoil blank 66, with the cores in place, is then given a final shaping to a desired configuration. The core material is removed from the cavities by leaching out the material with a suitable solution which is conducted to the cavities through holes formed in the end of the airfoil.

Having described one specific preferred embodiment of the invention, the following is claimed:

1. A method of making an airfoil, said method comprising the steps of forming an airfoil blank having first and second major side surfaces extending between leading and trailing edge portions of the airfoil blank, dividing the airfoil blank into a plurality of separate sections which include first and second sections with the first major side surface on the first section and the second major side surface on the second section, removing material from the first section to form a cavity in the first section, placing a core in the cavity, interconnecting the first and second sections with the core disposed in the cavity in engagement with the first and second sections, shaping the first and second sections with the core between them, and thereafter removing the core from the cavity while first and second sections are interconnected.

2. A method as set forth in claim 1 wherein said step of forming an airfoil blank includes the steps of providing first and second groups of plies, interconnecting the two groups of plies, and deforming the two groups of plies.

3. A method as set forth in claim 1 wherein said step of forming an airfoil blank includes the step of providing a separator section in the airfoil blank at a location between the major side surfaces of the airfoil blank, said step of dividing the airfoil blank into a plurality of sections including the steps of separating the separator section from portions of the airfoil blank on opposite sides of the separator section to form the first and second sections of the airfoil blank.

4. A method as set forth in claim 3 wherein said step of separating the separator section from portions of the airfoil blank includes the step of dissolving the separator section.

5. A method as set forth in claim 1 wherein said step of removing the core from the cavity includes the step of dissolving the core.

* * * * *